(12) United States Patent
Trott et al.

(10) Patent No.: US 11,713,862 B2
(45) Date of Patent: Aug. 1, 2023

(54) LIGHTING SYSTEMS INCLUDING DIFFUSERS FORMED WITH ADDITIVE MANUFACTURING

(71) Applicant: ABL IP Holding LLC, Atlanta, GA (US)

(72) Inventors: Gary Trott, Greensboro, GA (US); David Ferrier, Denver, CO (US); Noel Collver, Canton, GA (US); Dominic Large, Boulder, CO (US)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 17/164,172

(22) Filed: Feb. 1, 2021

(65) Prior Publication Data

US 2021/0239295 A1    Aug. 5, 2021

Related U.S. Application Data

(60) Provisional application No. 62/967,946, filed on Jan. 30, 2020.

(51) Int. Cl.
| | |
|---|---|
| *F21V 3/02* | (2006.01) |
| *F21V 17/16* | (2006.01) |
| *F21V 17/00* | (2006.01) |
| *F21V 17/12* | (2006.01) |
| *B29D 11/00* | (2006.01) |
| *B33Y 80/00* | (2015.01) |

(52) U.S. Cl.
CPC .......... *F21V 3/02* (2013.01); *B29D 11/00798* (2013.01); *B33Y 80/00* (2014.12); *F21V 17/002* (2013.01); *F21V 17/12* (2013.01); *F21V 17/164* (2013.01)

(58) Field of Classification Search
CPC .... F21V 17/14; F21V 17/18; B29D 11/00798
See application file for complete search history.

(56) References Cited

U.S. PATENT DOCUMENTS

| | | | | |
|---|---|---|---|---|
| 636,505 | A * | 11/1899 | Eddy | F21V 17/00 362/434 |
| 10,670,203 | B1 * | 6/2020 | Glazer | F21V 17/002 |
| 2007/0127233 | A1 * | 6/2007 | Liang | F21S 8/033 362/147 |
| 2010/0002451 | A1 * | 1/2010 | Reynolds | F21S 8/02 362/363 |

(Continued)

*Primary Examiner* — Eric T Eide
(74) *Attorney, Agent, or Firm* — Kilpatrick Townsend & Stockton LLP

(57) ABSTRACT

A lighting system includes an upper housing supporting a light engine, and a diffuser coupled to the upper housing. The diffuser may be monolithic, i.e. formed of a single material as a single piece without joints or seams where separate components are joined. The monolithic diffuser may be formed by an additive manufacturing process, for example 3D printing. The diffuser may couple to the upper housing with a tool-less connection. The portion of the tool-less connection defined by the diffuser may be formed by the additive manufacturing process. The lighting system may further include a lens coupled to the diffuser opposite the upper housing with a lens retaining ring. The lens retaining ring may be formed with an additive manufacturing process, and may define an annular snap-fit with the diffuser.

22 Claims, 16 Drawing Sheets

(56) References Cited

U.S. PATENT DOCUMENTS

| | | | |
|---|---|---|---|
| 2013/0016509 A1* | 1/2013 | Van de Ven | F21V 5/008 |
| | | | 362/235 |
| 2015/0338059 A1* | 11/2015 | Allen | F21V 17/06 |
| | | | 362/300 |
| 2017/0299155 A1* | 10/2017 | Bibi | F21V 1/20 |
| 2017/0332166 A1* | 11/2017 | Kikuchi | H04R 1/025 |
| 2020/0124240 A1* | 4/2020 | Jeong | F21L 4/08 |
| 2021/0148549 A1* | 5/2021 | Gongola | F21V 31/005 |
| 2021/0156546 A1* | 5/2021 | Demuynck | F21V 17/14 |

* cited by examiner

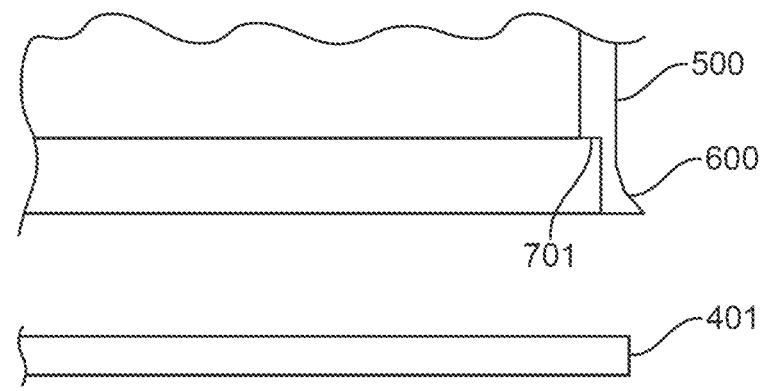
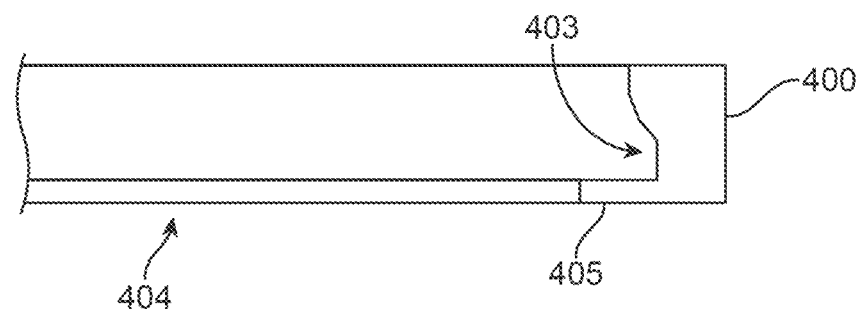
FIG. 7A
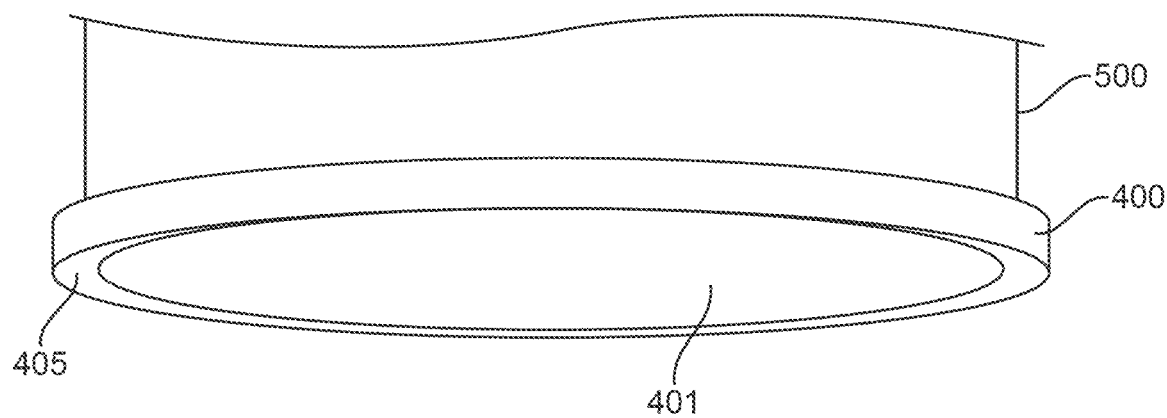
FIG. 7B

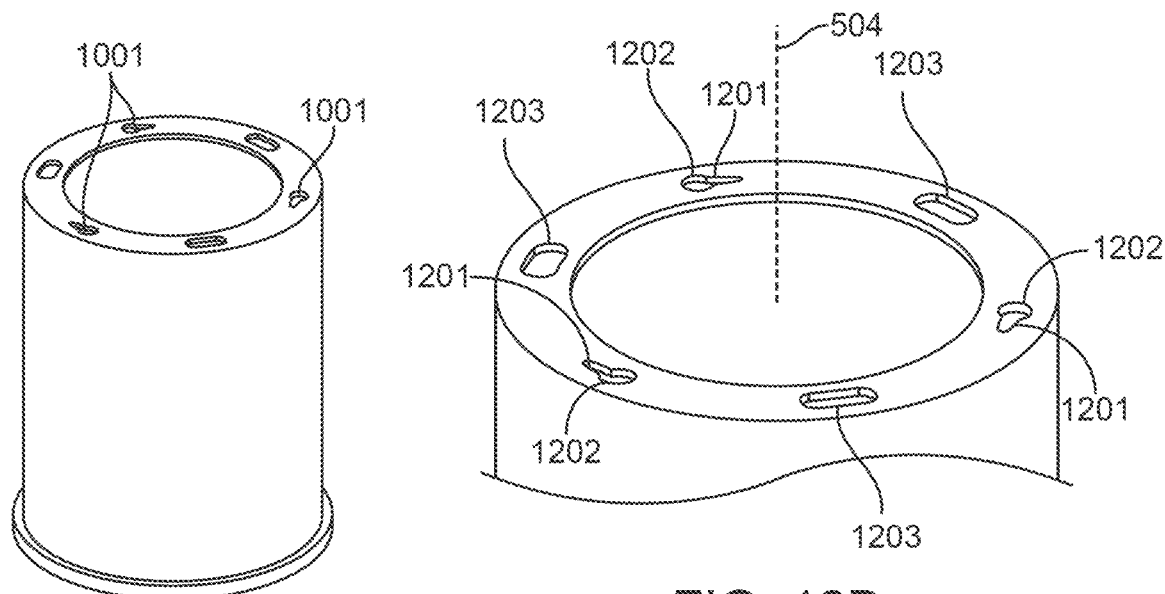

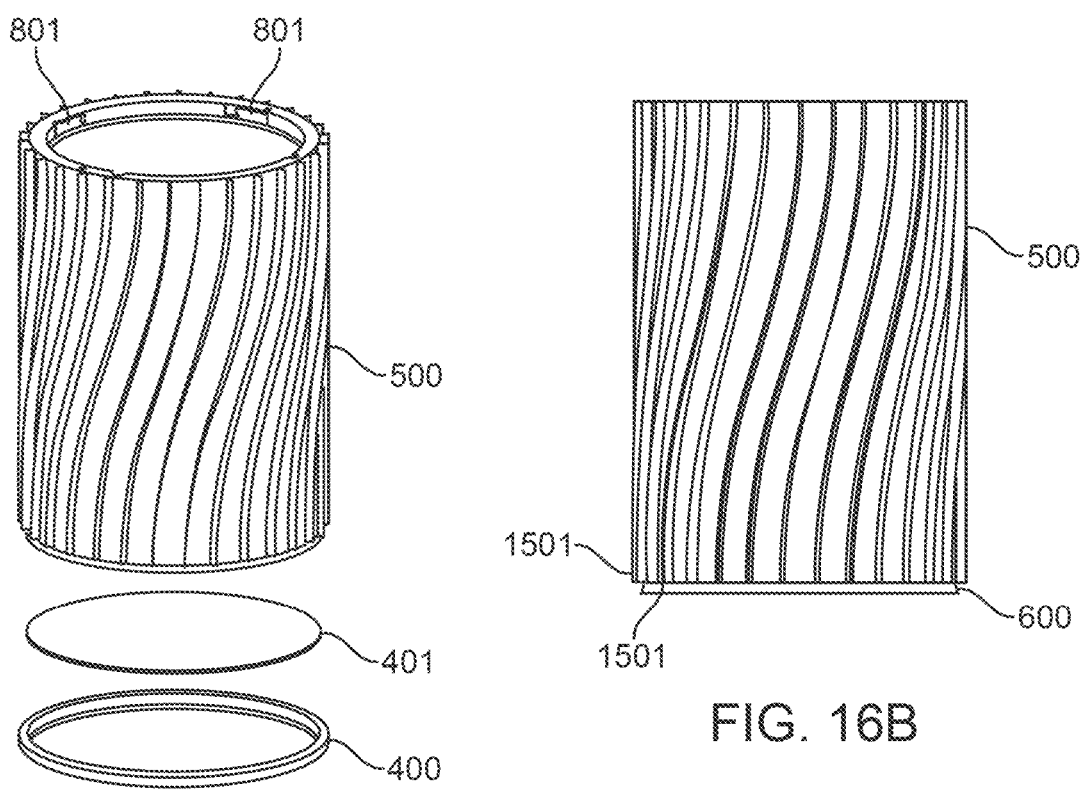
FIG. 16A
FIG. 16B
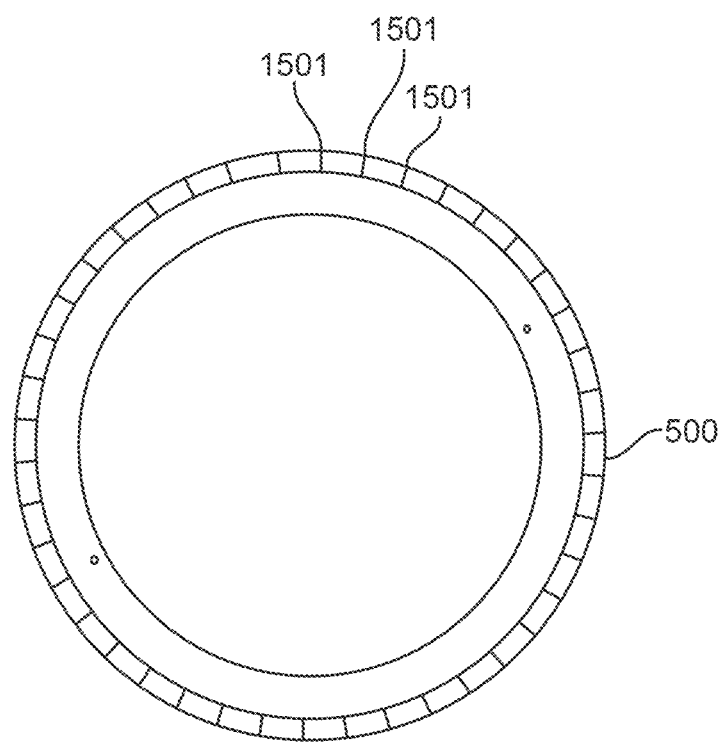
FIG. 16C

LIGHTING SYSTEMS INCLUDING DIFFUSERS FORMED WITH ADDITIVE MANUFACTURING

CROSS-REFERENCE TO RELATED APPLICATIONS

This application claims the benefit of U.S. Provisional patent application Ser. No. 62/967,946 file Jan. 30, 2020, the entire contents of which are hereby incorporated by reference.

FIELD OF INVENTION

The present technology relates to the field of lighting systems including diffusers.

BACKGROUND

Lighting systems may include a light engine provided in a housing and that emits light through a diffuser coupled to the housing. In some instances, complex geometries of the diffuser require separate parts to be separately molded and coupled together to form the diffuser. Separately molding multiple parts and subsequently connecting the parts together to form a diffuser is time consuming, costly, and results in a diffuser including visible seams at the joints of the separate parts which are both visually unappealing and define weak points of the diffuser.

SUMMARY OF THE INVENTION

The present technology relates to lighting systems including an upper housing containing a light engine, and a diffuser coupled to the upper housing. The diffuser may be monolithic, i.e. formed of a single material as a single piece without joints or seams where separate components are joined. The monolithic diffuser may be formed by an additive manufacturing process, for example 3D printing.

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

BRIEF DESCRIPTION OF THE DRAWINGS

The disclosure will be readily understood by the following detailed description in conjunction with the accompanying drawings, wherein like reference numerals designate like structural elements, and in which:

FIGS. 7A and 7B show views of a lip coupled to a lens retaining ring, according to embodiments of the technology.

FIGS. 12A and 12B show views of an assembly of a diffuser, lens retaining ring and lens of a lighting system, according to embodiments of the technology.

FIGS. 16A-16C show views of a lighting system including a diffuser with wave-shaped ridges, according to embodiments of the technology.

DETAILED DESCRIPTION OF THE INVENTION

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below.

Figure 1A:
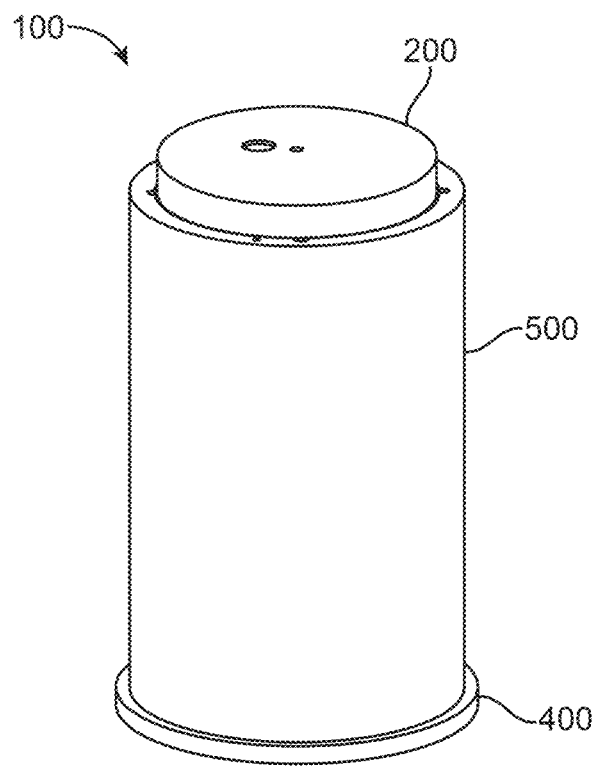
FIGS. 1A and 1B show views of a lighting system, according to embodiments of the technology.
Figure 1B:
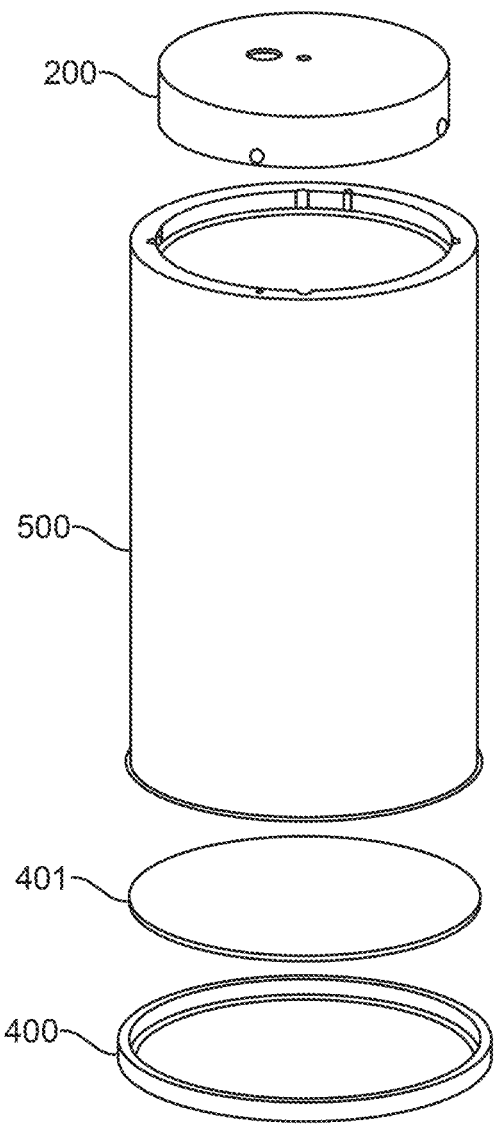

FIG. 1A shows an embodiment of a lighting system 100. FIG. 1B shows an exploded view of the lighting system 100. As shown, the lighting system 100 comprises an upper housing 200, a diffuser 500, a lens 401, and a lens retaining ring 400. The upper housing 200 is coupled to the diffuser 500. The lens retaining ring 400 is coupled to the diffuser 500 with the lens 401 mechanically captured between the diffuser 500 and the lens retaining ring 400. In some embodiments, the diffuser 500 may define a closed or open end, wherein a lens retaining ring 400 and lens 401 are not present.

Figure 2A:
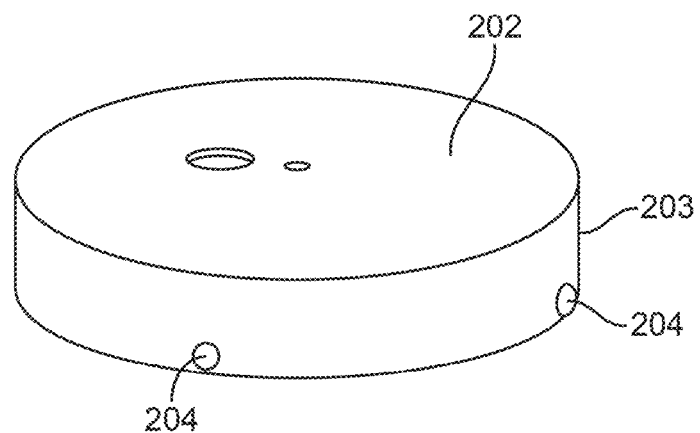
FIGS. 2A-2C show views of an upper housing of a lighting system, according to embodiments of the technology.
Figure 2B:
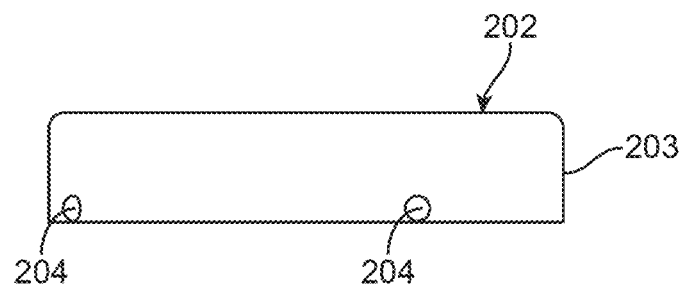
Figure 2C:
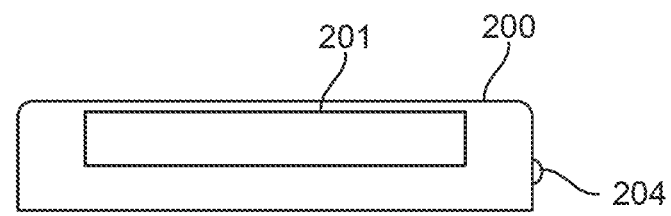

FIGS. 2A-2C show an embodiment of an upper housing 200. The upper housing 200 may comprise a monolithic body. The monolithic body may be cylindrical and comprise a top side 202 and a sidewall 203. As shown, the top side 202 may be circular and the sidewall 203 may be cylindrical. In embodiments, the upper housing 200 may be other shapes, including but not limited to rectangular prism, conical, hemispherical and pyramid. The upper housing 200 may be used to connect the lighting system 100 to a mounting surface. For example the upper housing 200 may be coupled to a wall or ceiling.

The upper housing 200 may house a light engine 201. The light engine may include light source(s) (e.g., LEDs, fluorescent bulbs, incandescent bulbs), electronics for powering and controlling the light engine (e.g. driver, circuitry, etc.), and optical components (e.g. reflectors, baffles, lenses, etc.) for controlling the appearance and/or directionality of the light emitted from the lighting system 100. Input power lines and/or other wiring (not shown) may extend into the upper housing 200 to connect to one or more power sources (e.g. drivers) and/or other electronics within the upper housing 200 for powering and controlling the light engine 201.

Figure 3A:
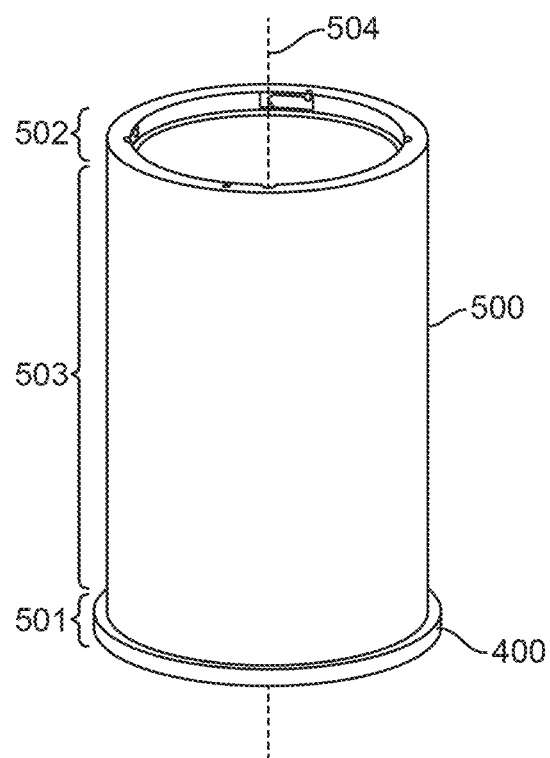
FIGS. 3A and 3B show views of an assembly of a diffuser, lens retaining ring and lens of a lighting system, according to embodiments of the technology.
Figure 3B:
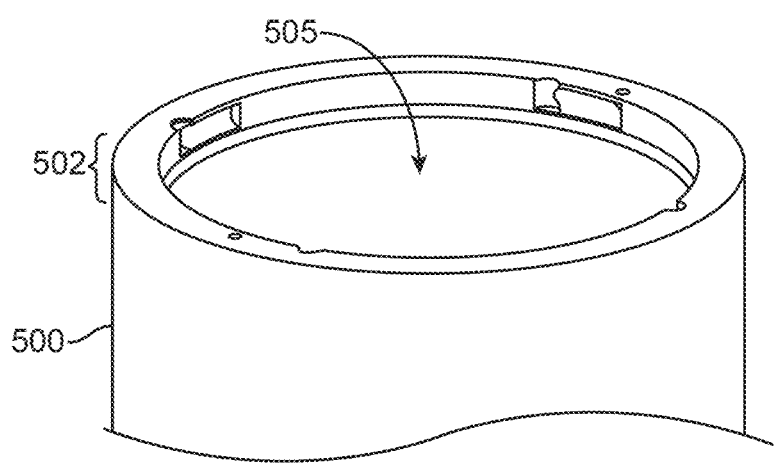

FIGS. 3A and 3B show views of an assembly of a diffuser 500, a lens retaining ring 400, and a lens 401 (not visible in FIGS. 3A and 3B). As shown in FIG. 3A, the lens retaining ring 400 is coupled to the diffuser 500 at a lower portion 501 of the diffuser 500, opposite an upper portion 502 of the diffuser 500. The diffuser 500 may extend along a longitudinal axis 504 from the lower portion 501 to the upper portion 502, with a central portion 503 in between. As shown in FIG. 3B, the upper portion 502 may define an opening 505 into a central hollow cavity defined by the diffuser 500. The upper portion 502 is coupled to the upper housing 200 so that light emitted from the light engine 201 may pass through the opening 505 and into the central hollow cavity. The diffuser 500 may be translucent or transparent so that light may exit the central hollow cavity through the diffuser 500 and/or through the lens 401. In some embodiments, the diffuser may be opaque, or substantially opaque, and define a plurality define a plurality, e.g. 1000+, of small openings, e.g. <1 mm diameter, through which light may pass through the diffuser 500 similar to translucent or transparent diffusers 500. Light passing through the diffuser 500 may be diffused in directions radial to the longitudinal axis 504.

Figure 4A:
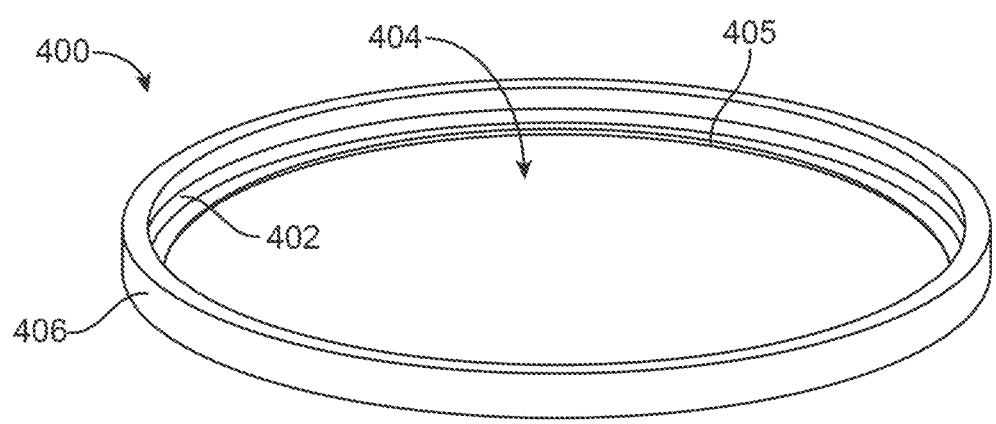
FIGS. 4A and 4B show views of a lens retaining ring and lens, according to embodiments of the technology.
Figure 4B:
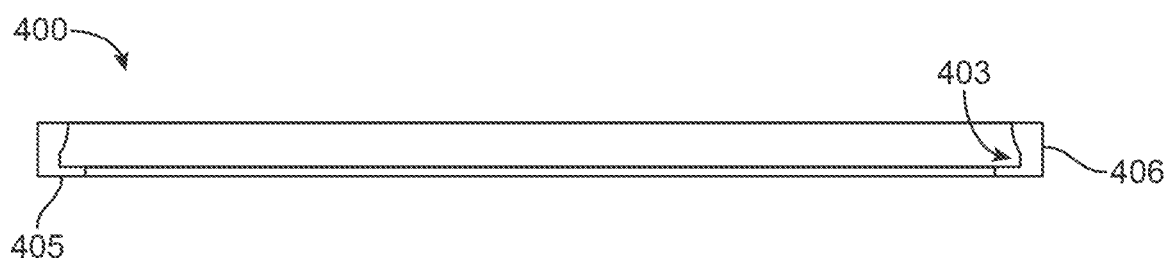

FIG. 4A shows a perspective view and FIG. 4B shows a cross-sectional view of a lens retaining ring 400. The lens retaining ring 400 may define an outer side 406 and an inner side 402. The outer side 406 faces away from the longitudinal axis 504 and the inner side 402 faces toward the longitudinal axis 504 and defines an opening 404 of the lens retaining ring 400. The inner side 402 may define a groove 403 extending around an inner perimeter of the lens retaining ring 400 and facing the longitudinal axis. As shown in FIG. 4A, the lens retaining ring 400 may be circular. In some embodiments, the lens retaining ring 400 may be other shapes, for example but not limited to rectangular, triangular, oblong, and polygonal. The lens retaining ring 400 may correspond to the shape of the lens 401 and the lower portion 501 of the diffuser 500.

Figure 5A:
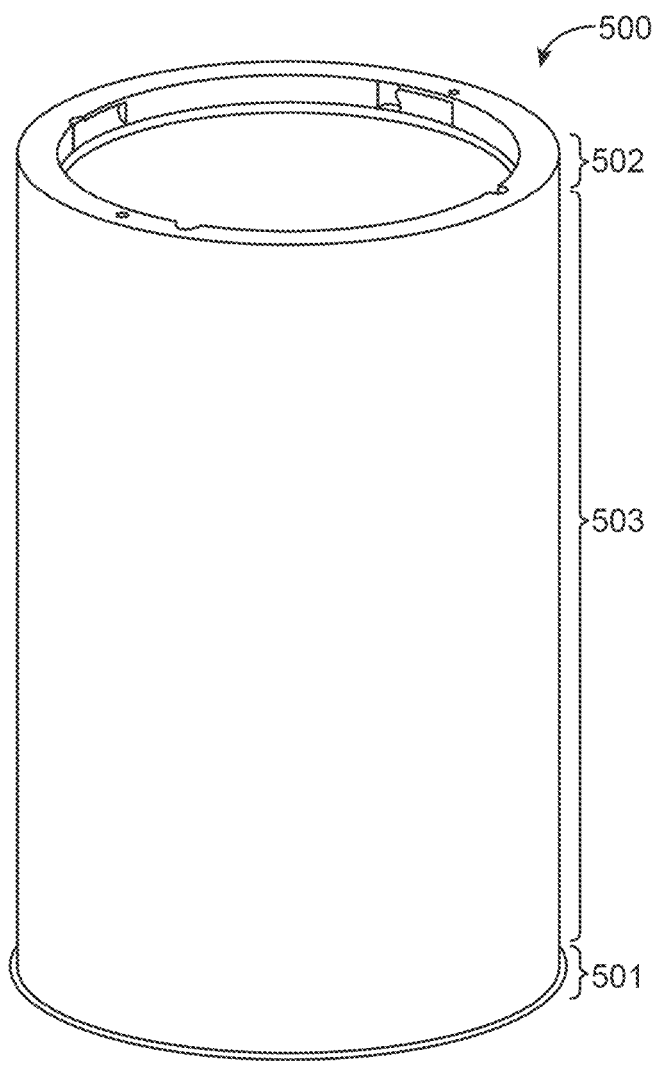
FIGS. 5A-5C show views of a diffuser, according to embodiments of the technology.
Figure 5B:
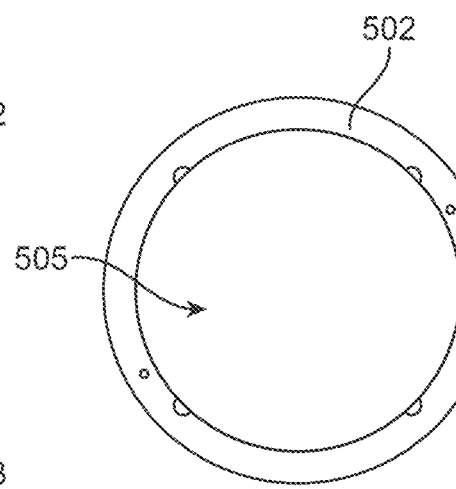
Figure 5C:
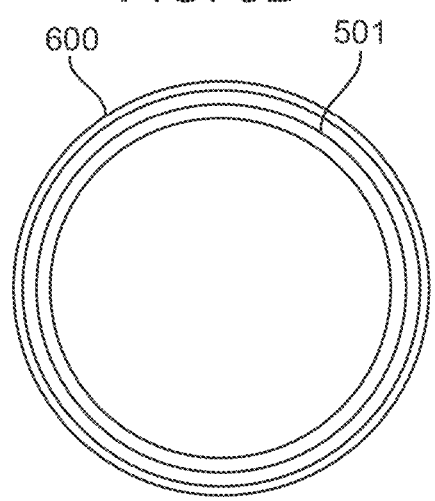

FIG. 5A shows a side perspective view, FIG. 5B shows a top view, and FIG. 5C shows a bottom view of an embodiment of a diffuser 500. In some embodiments, for example as shown, the diffuser 500 may be generally cylindrical, wherein the central portion 503 defines a uniform circular cross-section, and the upper portion 502 and the lower portion 501 define circular cross-sections of similar, e.g. +/−10%, diameter as the central portion 503. In some embodiments, the diffuser 500 may be any shape and/or cross-section and/or combination thereof including but not limited to square, rectangular, triangular, polygonal, circular, and oblong. In some embodiments, the diffuser may have a plurality of cross-sections which may have different sizes and/or shapes. In some embodiments, including embodiments with varying cross-sections, the lower portion 501 and central portion 503 may consists of a single walled hollow body. For example, as shown in FIGS. 5A-5C, the lower portion 501 and central portion 503 of the diffuser 500 are a single walled hollow body cylinder.

Figure 6A:
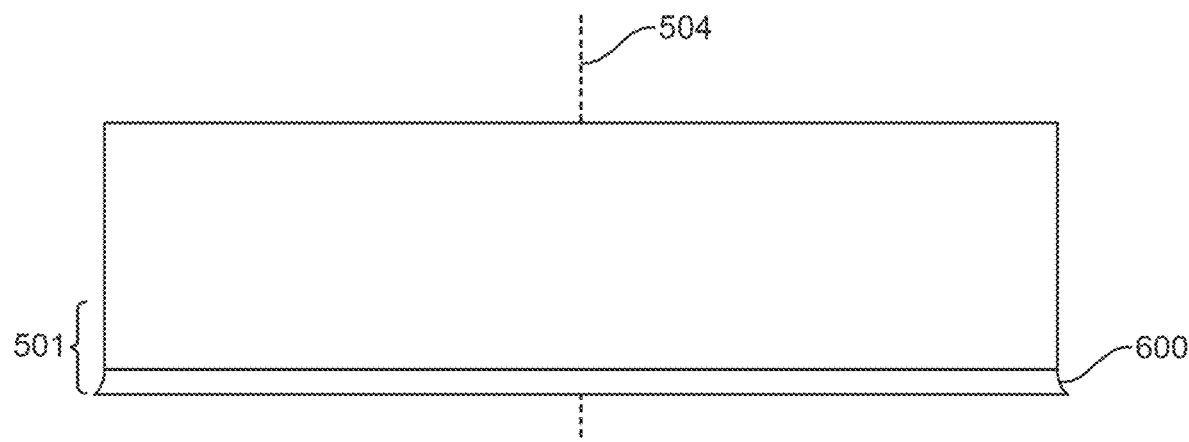
FIGS. 6A and 6B show views of a lip of a diffuser, according to embodiments of the technology.
Figure 6B:
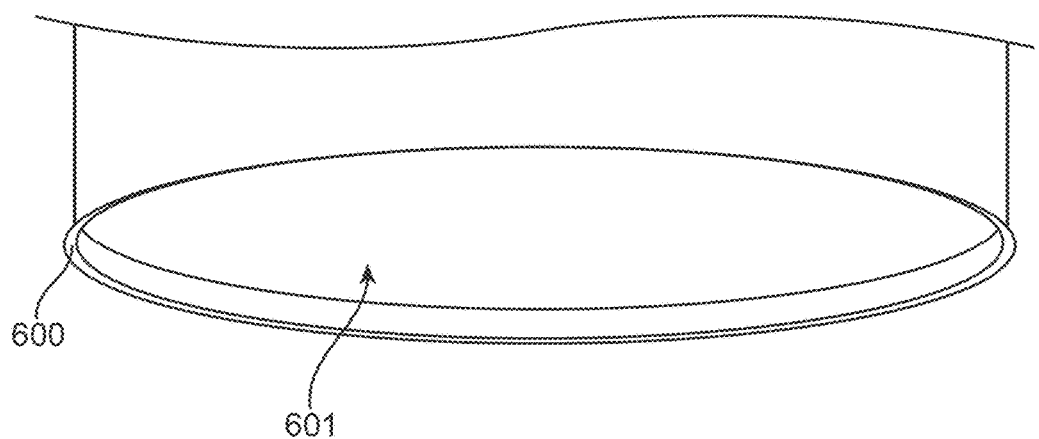

The diffuser 500 may define a lip 600 extending around the lower portion 501, as shown in FIGS. 6A and 6B. The lip 600 may extend radially away from the longitudinal axis 504. As shown in FIG. 6B, the lip 600 may be located at a bottom edge of the diffuser 500 around a bottom opening 601 of the diffuser. In some embodiments, the lip 600 may be contiguous around the entire perimeter of the lower portion 501. In some embodiments, the lip 600 may be intermittent and comprise a plurality of sections around the perimeter of the lower portion 501. As shown, the lip 600 may have a triangular shaped cross-section. In some embodiments, the cross-section of the lip 600 may be other shapes, including round and square. In some embodiment, the lip 600 may extend into the opening radially toward the longitudinal axis 504.

FIG. 7A shows an exploded view of a portion of the assembly of the diffuser 500, the lens 401 and the lens retaining ring 400. The groove 403 defined by the lens retaining ring 400 may correspond in shape and size with the lip 600 in order to define an annular snap-fit coupling between the diffuser 500 and the lens retaining ring 400. In some embodiments, the lens retaining ring 400 may define the lip 600 and the lower portion 501 of the diffuser may define the groove 403 in order to define the annular snap-fit. As shown, the annular snap-fit is defined on the outer side of the lower portion 501 and the inner side of the lens retaining ring 400. In some embodiments, the annular snap-fit is defined on the inner side of the lower portion 501 and the outer side of the lens retaining ring 400.

As shown in FIG. 7A, the lens 401 may correspond in shape and size to be larger than the opening 404 of the lens retaining ring 400. For example, the lens 401 may be circular, as shown in FIG. 1B, or may be rectangular. The lens retaining ring 400 may define a ledge 405 around the opening 404 for retaining a bottom side of the lens 401. In some embodiments, the lens may be retained between the ledge 405 and the lip 600 and/or bottom edge of the lower portion 501 of the diffuser 500. In some embodiments, the diffuser 500 may define an internal ledge 700, for example as shown in FIG. 7A, and the lens 401 may be retained between the internal ledge 700 and the ledge 405.

The lens retaining ring 400 may be coupled to diffuser 500 without the use of adhesives or fasteners, and the lens 401 may be retained in the lighting system 100 only by the annular snap-fit formed by the lip 600 and groove 403. This arrangement is beneficial in allowing the lens to be easily exchanged for a different lens. For example, to replace a lens the lens retaining ring 400 may be unsnapped from the diffuser, the now uncoupled lens 401 may be removed from the groove 403 of the lens retaining ring 400 and a different lens may then be placed in the lens retaining ring 400. Next, the lens retaining ring 400 holding the different lens 401 may be coupled to the diffuser with the annular snap-fit.

The upper portion 502 of the diffuser 500 may be coupled to the upper housing 200 with a tool-less connection. In some embodiments, the tool-less connection may allow the diffuser 500 to be coupled to and uncoupled from the upper housing 200 by rotating the diffuser 500 in a direction around the longitudinal axis 504. In some embodiments, the rotation of the diffuser in order to couple or uncouple the tool-less connection is less than 360 degrees, less than 180 degrees, less than 90 degrees, and/or less than 45 degrees.

Figure 8A:
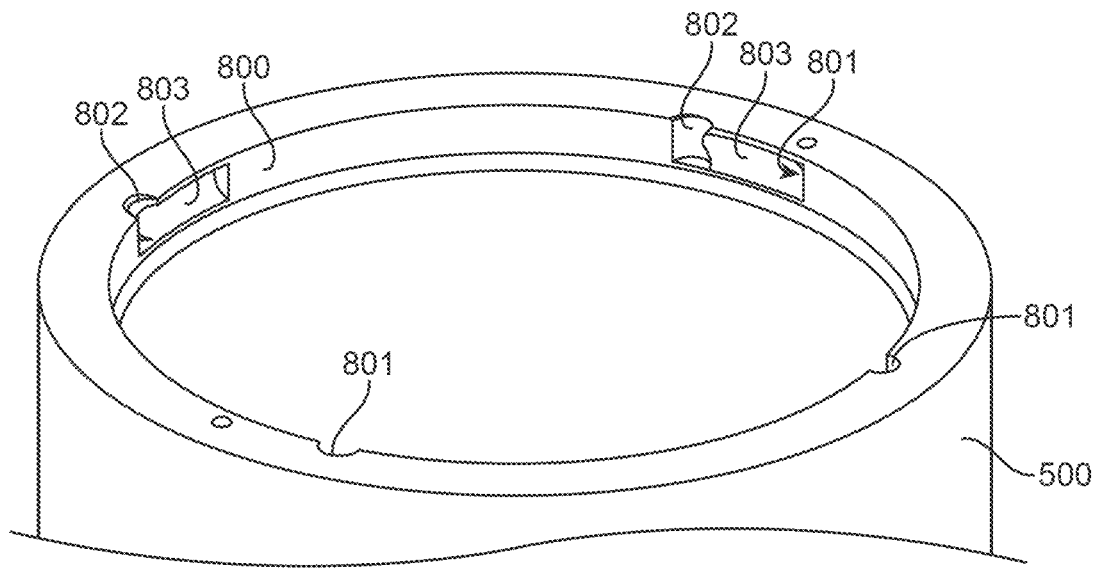
FIGS. 8A and 8B show views of an upper portion of a diffuser, according to embodiments of the technology.
Figure 8B:
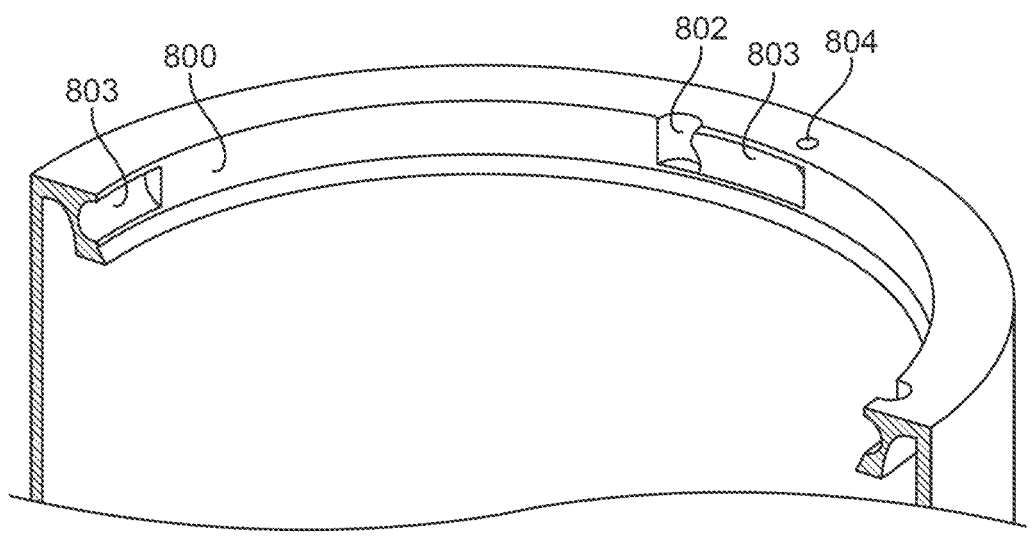

In some embodiments, the tool-less connection may include a slot/tab configuration. For example, as shown in FIG. 8A, the upper portion 502 of the diffuser 500 may comprise an internal sidewall 800 around and defining the opening 505. In some embodiments, for example as shown in FIGS. 8A and 8B, the internal sidewall 800 may be circular. The shape and size of the internal sidewall 800 may correspond in shape and size to the sidewall 203 of the upper housing 200 so that the upper housing may be inserted into the opening 505.

The internal sidewall 800 may comprises a plurality of L-shaped slots 801 each comprising a first slot portion 802 extending substantially or directly parallel to the longitudinal axis 504 and a second slot portion 803 extending along a curved path around and substantially or directly perpendicular to the longitudinal axis 504. The upper housing 200 may define a plurality of tabs 204 extending radially away from the longitudinal axis 504 and sidewall 203, as shown for example in FIGS. 2A and 2B. The number, shape, size, and position of the tabs 204 corresponds to the number, shape, size, and position of the L-shaped slots 801. For example, in some embodiments, the lighting system 100 may include three tabs 204 and three L-shaped slots 801, however a lighting system 100 may include any number. As shown, the tabs 204 may be hemispherical. In some embodiments, the tabs may be rectangular or triangular.

Figure 9A:
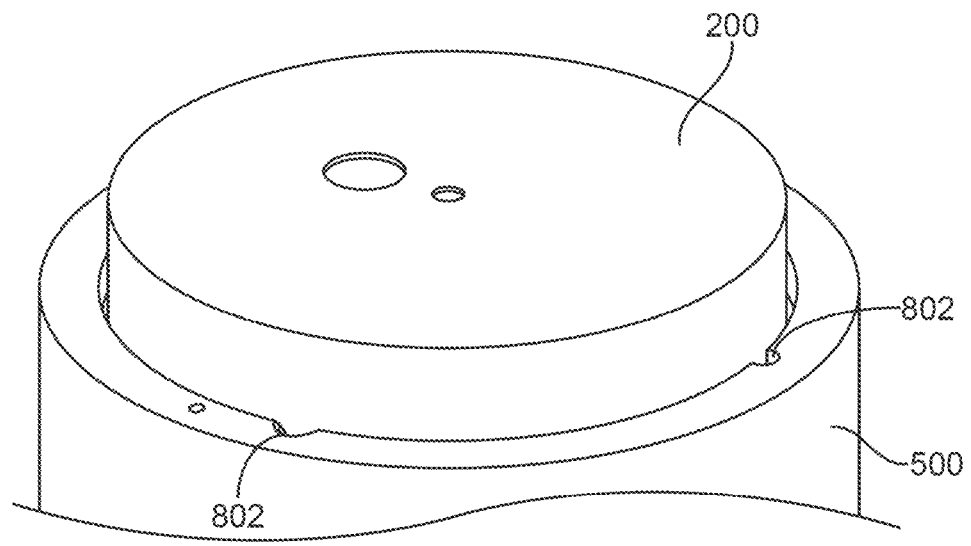
FIGS. 9A and 9B show views of a diffuser coupled to an upper housing with a tool-less connection, according to embodiments of the technology.
Figure 9B:
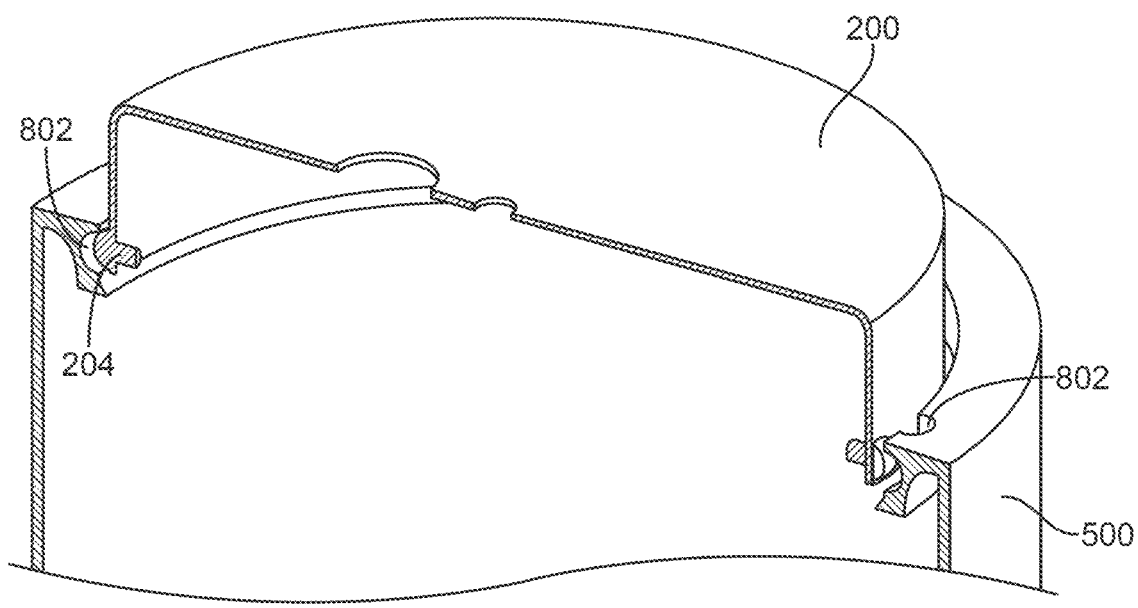

The tabs 204 and L-shaped slots 801 define an embodiment of a tool-less connection between the upper housing 200 and the diffuser 500. To couple the upper housing 200 to the diffuser 500, the diffuser 500 is positioned so that the tabs 204 are positioned at upper openings of the first slot portion 802, and the diffuser 500 is translated in the direction of the longitudinal axis 504 so that the upper housing 200 is positioned within the opening 505, as is shown in FIG. 9A. In this position the diffuser 500 may be rotated around the longitudinal axis 504 so that the tabs 204 move along the second slot portion 803 until they reach the end of the second slot portion 803 that is opposite the first slot portion 802, as is shown in the cross-sectional view of FIG. 9B. In some embodiments with a slot/tab configuration, the tabs 204 may extend from the internal sidewall 800 and the L-shaped slots 801 may be defined on the upper housing 200.

The amount of rotation to couple the diffuser 500 to the upper housing 200 with a slot/tab configuration corresponds to the arc length of the second slot portion 803. In embodiments, the arc length may be between 5 degrees and 45 degrees, In some embodiments, a tool-less connection comprises a coupling of two parts wherein the parts may be coupled without the use of the tools in a way that prevents unintentional uncoupling of the part. In some embodiments, the tool-less connection between the diffuser 500 and the upper housing 200 may not include securing the parts together, so that the diffuser 500 may be easily uncoupled from the upper housing 200 and replaced with a different diffuser. In some embodiments, a tool-less connection may additionally include the use of fasteners, e.g. screw, bolts, clips, in order to further secure the already coupled parts in order to prevent unintentional uncoupling. For example, the upper portion 502 of the diffuser 500 may define a set screw hole 804 for receiving a set screw preventing the tab 204 from moving in the L-shape slot 801.

Figures 10A, 10B:
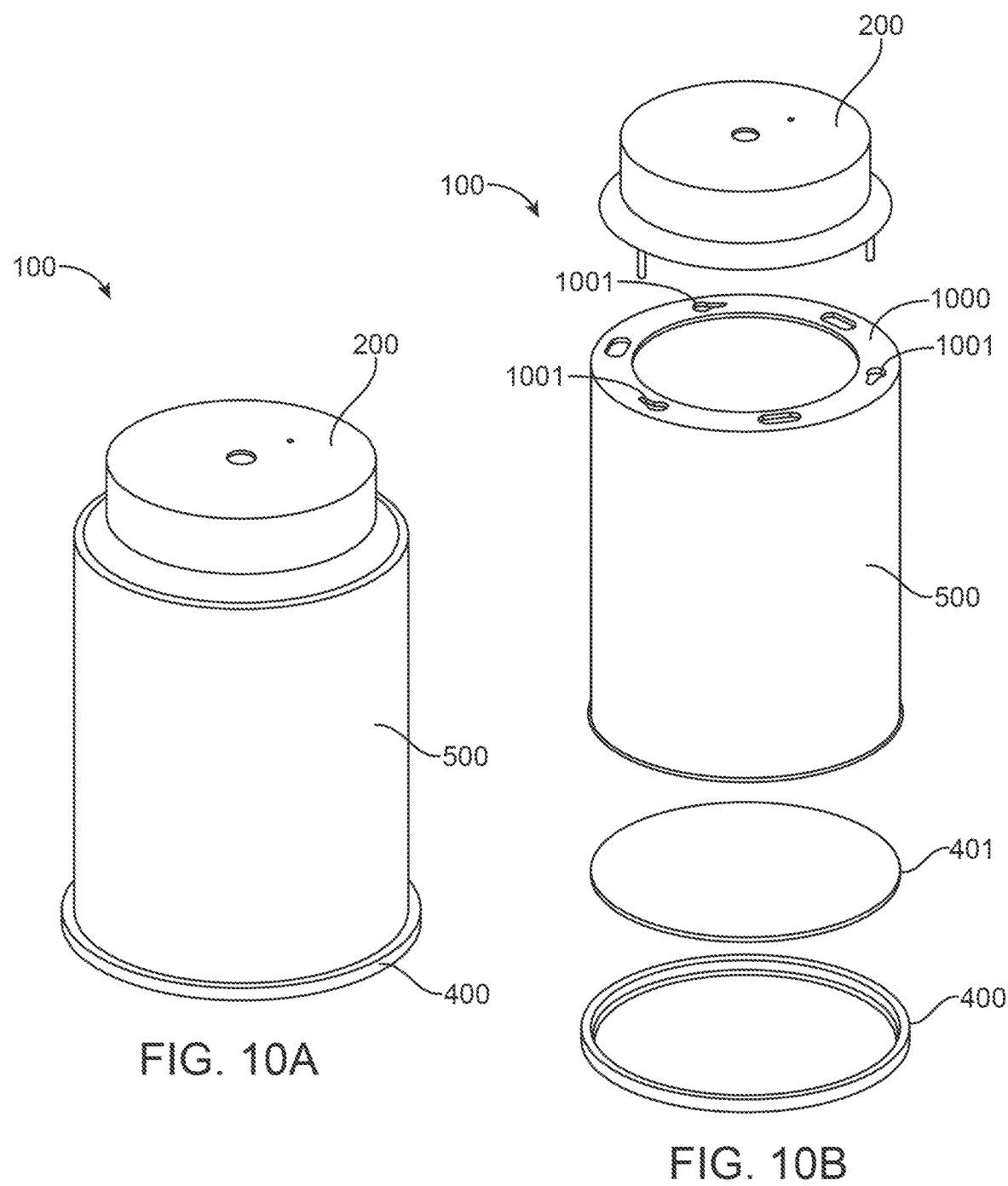
FIGS. 10A and 10B show views of a lighting system, according to embodiments of the technology.

In some embodiments, the tool-less connection may include a keyhole/stud configuration. For example, as shown in FIG. 10A, the upper portion 502 of the diffuser 500 may comprise a top surface 1000. The top surface 1000 may be planar and extend substantially or directly perpendicularly relative to the longitudinal axis 504. The top surface 1000 may define the opening 505 into the internal cavity of the diffuser 500. In some embodiments, for example as shown in FIG. 10B, the top surface 1000 may be circular. The shape and size of the top surface 1000 may correspond in shape and size of the corresponding upper housing 200 so that the upper housing 200 may seat over the top surface 1000, for example as shown in FIG. 10A.

The top surface 1000 may define a plurality keyhole openings 1001. As shown in FIG. 12B, each keyhole opening 1001 comprises a narrow portion 1201 connected to a wide portion 1202. The narrow portions 1201 and the wide portions 1202 are both arranged at the same radial distance from the longitudinal axis 504. In some embodiments, the top surface 1000 may further define one or more passages 1203. As shown in FIG. 12B, the passages may be in between the keyhole openings 1001. In some embodiments, the passages 1203 allow for hardware from or associated with the light engine 201 to extend into the diffuser 500.

Figure 11A:
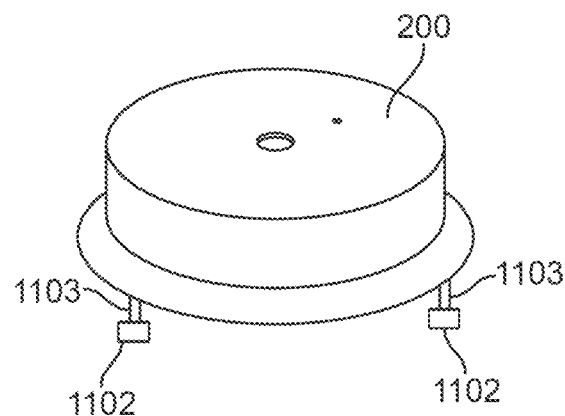
FIGS. 11A-11C show views of an upper housing of a lighting system, according to embodiments of the technology.
Figure 11B:
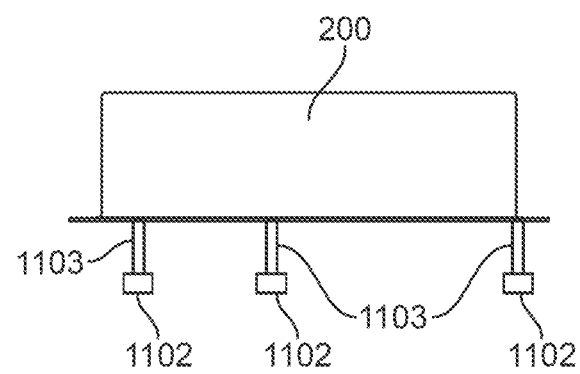
Figure 11C:
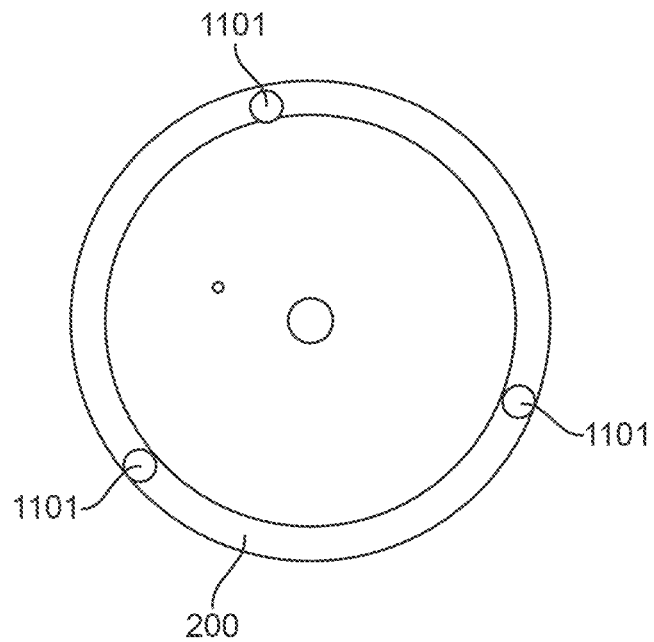

An upper housing 200 used in a keyhole/stud configuration may comprise a plurality of studs 1101 extending parallel to the longitudinal axis, as shown in FIGS. 11A-11C. Each stud 1101 comprises a head 1102 and a shaft 1103, which may be formed integrally or which may be separate parts that can attach together. The studs 1101 may be integrally formed with the body of the upper housing 200 or may be formed separately. In some embodiments the studs 1101, or portions thereof, may each comprise a screw extending from the body of the upper housing 200. In some embodiments, the head 1102 of the stud 1101 may comprise a head of a screw. The number, shape, size, and position of the studs 1101 corresponds to the number, shape, size, and position of the keyhole openings 1001. For example, in some embodiments, the lighting system 100 may include three studs 1101 and three keyhole openings 1001, however a lighting system 100 may include any number of studs and keyhole openings. The cross-dimension (e.g. width, diameter, etc.) of the heads 1102 of the studs 1101 are smaller in cross-dimension than a cross-dimension of the wide portion 1202 and larger in cross-dimension than a cross-dimension of the narrow portion 1201. The cross-dimension of the shafts 1103 of the studs 1101 is smaller than that of the heads 1102 and smaller than that of the narrow portion 1201.

Figure 14A:
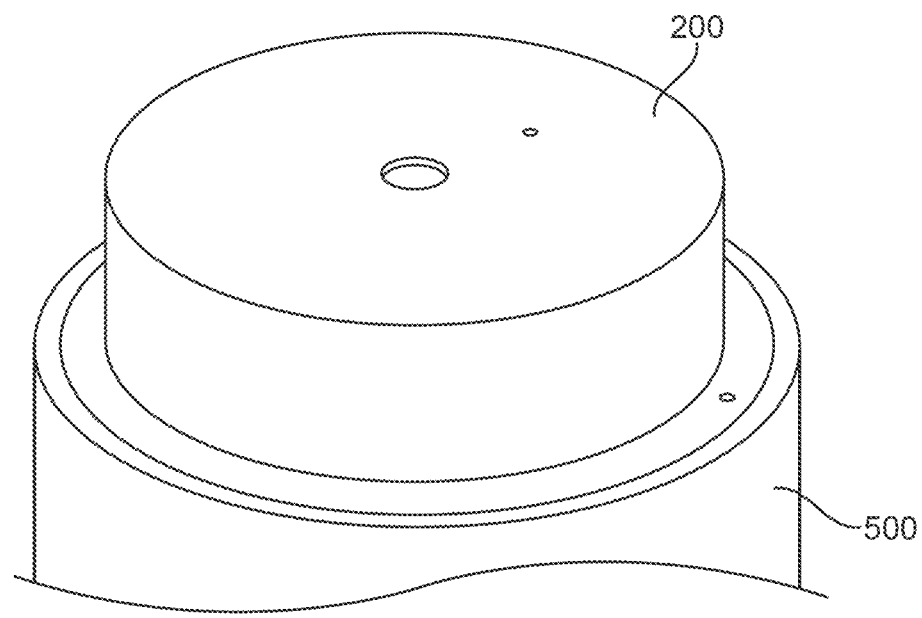
FIGS. 14A and 14B show views of a diffuser coupled to an upper housing with tool-less connection, according to embodiments of the technology.
Figure 14B:
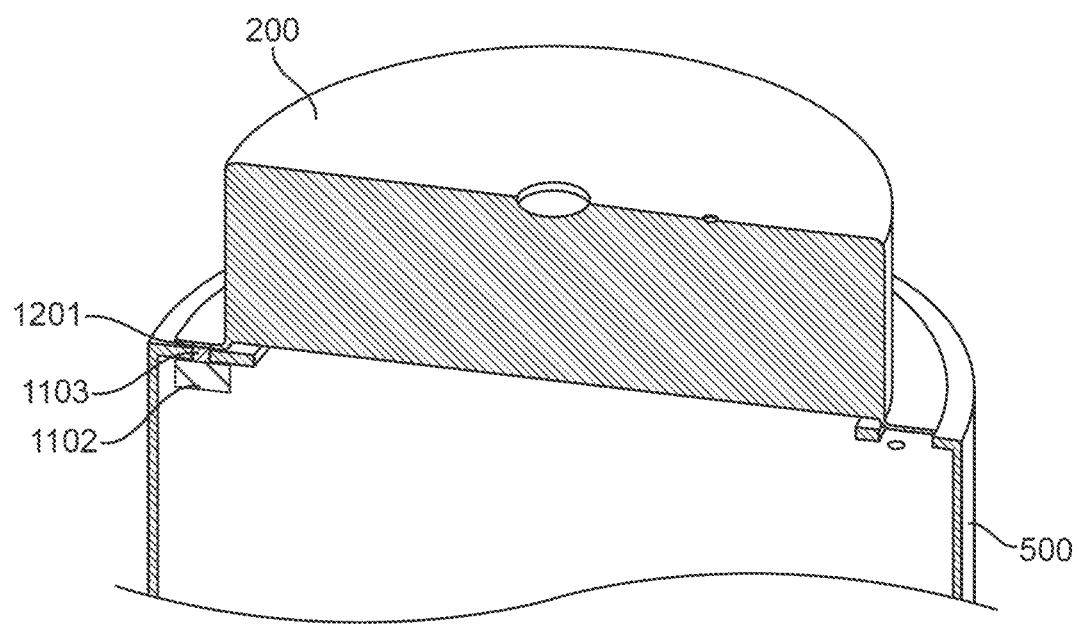

The studs 1101 and keyhole openings 1001 define an embodiment of a tool-less connection between the upper housing 200 and the diffuser 500. To couple the upper housing 200 to the diffuser 500, the diffuser 500 is positioned so that the studs 1101 are positioned over the wide portion 1202 of the keyhole opening 1001, and the head 1102 of each stud 1101 is inserted into the wide portion 1202. In this position the diffuser 500 may be rotated around the longitudinal axis 504 so that the shafts 1103 of each stud 1101 ride along the narrow portion 1201, as is shown in the cross-sectional view of FIG. 14B. Because the head 1102 of each stud 1001 has a cross-wise dimension larger than the narrow portion 1201, the studs 1101 do not back out from the keyhole opening 1001 in the direction of the longitudinal axis 504. In embodiments where the studs 1101 are screws, the studs 1101 can be tightened to further reinforce their retention within the keyhole openings 1001.

The amount of rotation to couple the diffuser 500 to the upper housing 200 with a keyhole/stud configuration corresponds to the arc length between the position wherein the heads 1102 are in the wide portion 1202 and the position wherein the shaft 1103 is at the end of the narrow portion 1201. In embodiments, the arc length may be between 5 degrees and 45 degrees. In some embodiments wherein the heads 1102 are comprised of heads of screws, after the diffuser 500 is initially coupled to the upper housing 200 with the keyhole/stud configuration the screws of each stud 1101 may be tightened to prevent rotation and therefore uncoupling of the diffuser 500 from the upper housing 200.

Figure 13A:
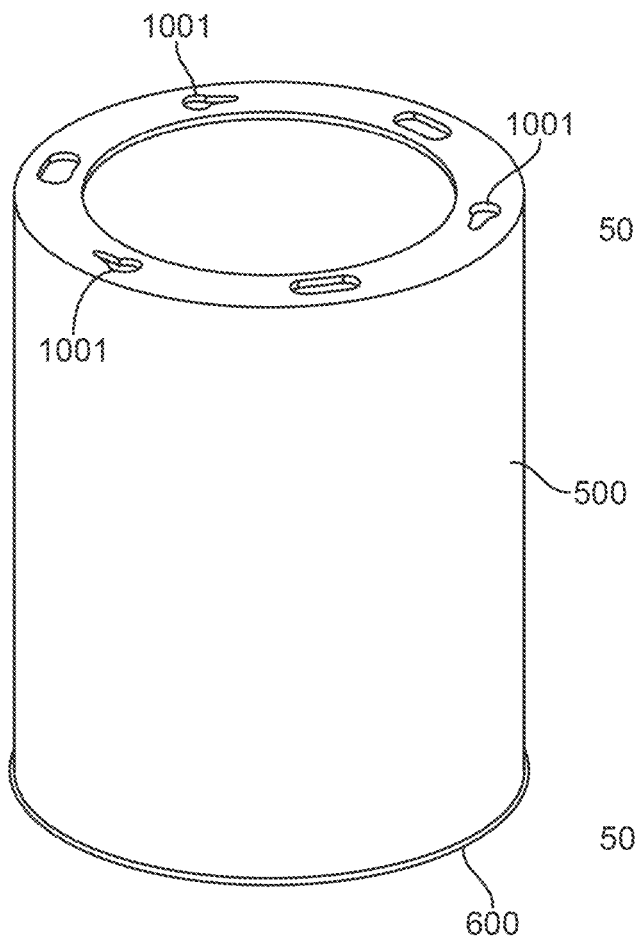
FIGS. 13A-13C show views of a diffuser, according to embodiments of the technology.
Figure 13B:
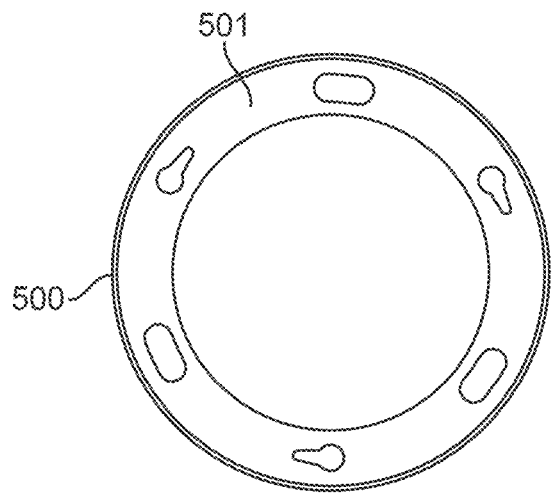
Figure 13C:
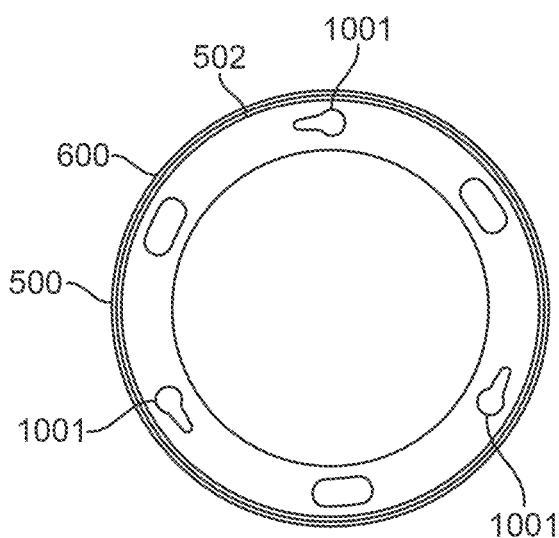

In some embodiments, one or more components of the lighting system 100 may be formed with additive manufacturing, for example 3D printing. In some embodiments, the entire diffuser 500 is formed monolithically with additive manufacturing. For example, each feature of the diffuser 500 as shown in FIG. 5A, including the lower portion 501, upper portion 502, central portion 503, opening 505, lip 600 and L-shaped slots 801 may be formed and defined entirely with additive manufacturing, without the use of molding and/or subtractive manufacturing (e.g. machining/milling). Further, for example, each feature of the diffuser 500 as shown in FIG. 13A, including the lower portion 501, upper portion 502, central portion 503, opening 505, lip 600 and keyhole openings 1001 may be formed and defined entirely with additive manufacturing, without the use of molding and/or subtractive manufacturing (e.g. machining/milling). Forming the diffuser 500 entirely with additive manufacturing is beneficial in that the resulting diffuser is monolithic, and therefore does not result in the creation of seams or joints between large sub-parts, which can not only detract from the desired aesthetic of the diffuser during light diffusion but also detrimentally impact (i.e., weaken) the strength of the diffuser. Further, forming the diffuser 500 entirely with additive manufacturing is also beneficial in the complex geometries not possible with a single molded piece are possible. For example, a single molded piece could not achieve the lip 600 and L-shaped slots 801 of the diffuser of FIG. 5A.

Additionally, additive manufacturing allows for complex geometries on the central portion 503 which are not possible with a single molded piece. For example, FIGS. 15A-15C and 16A-16C show lighting systems 100 with diffusers 500 including wave-shaped ridges 1501. As shown, the wave-shaped ridges 1501 extend in a substantially longitudinal direction relative to the longitudinal axis 504 with curves in the radial direction. In some embodiments, the central portion 503 comprises a single walled hollow body and a plurality of ridges extending from the single walled hollow body. In some embodiments, ridges on the outer surface of the diffuser 500 may be any shape, and may be separate or intersect with other ridges. In some embodiments, the outer surface of the diffuser 500 may additionally or alternatively include protrusions other than ridges. The protrusions, including ridges, may provide either or both of aesthetics and structural advantages.

Figure 15A:
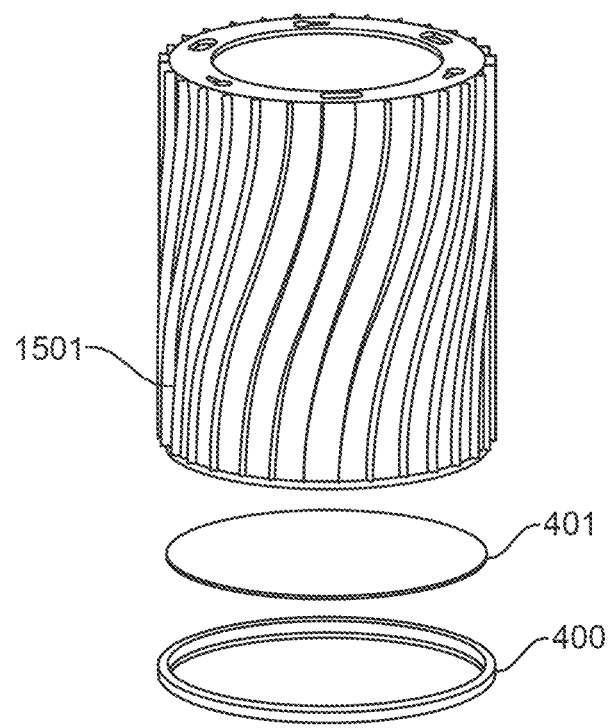
FIGS. 15A-15C show views of a lighting system including a diffuser with wave-shaped ridges, according to embodiments of the technology.
Figures 15B, 15C:
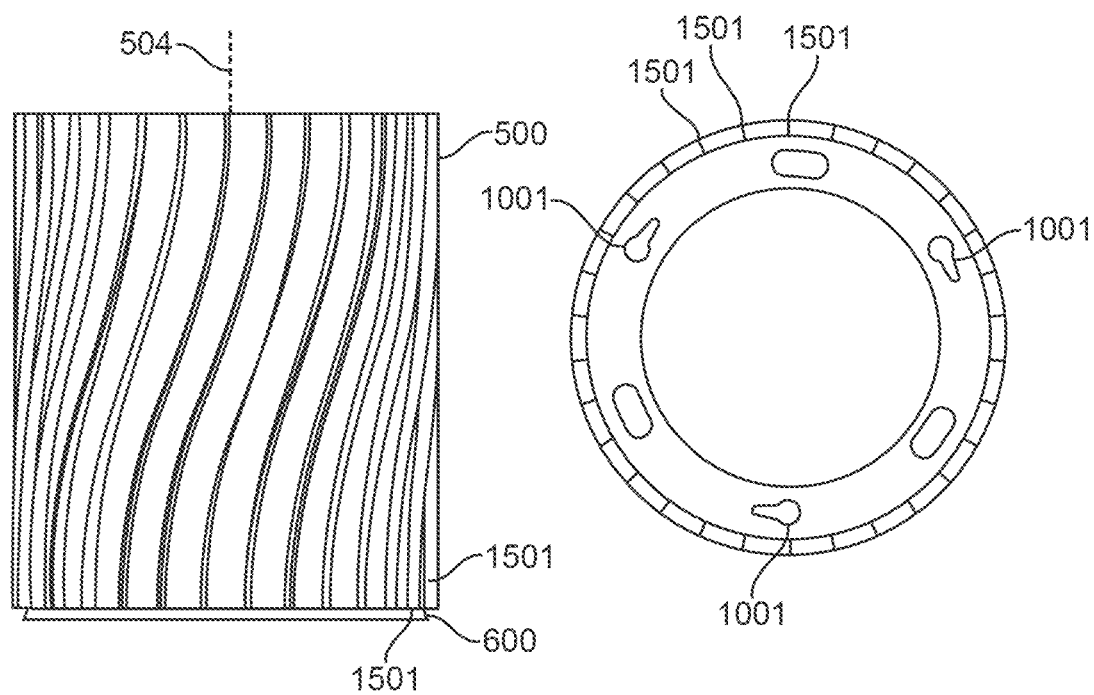

In some embodiments, the protrusions extending from the outer surface of the diffuser may be formed monolithically with additive manufacturing. For example, each feature of the diffuser 500 as shown in FIGS. 15A-C, including the lower portion 501, upper portion 502, central portion 503, opening 505, lip 600, keyhole openings 1001, and ridges 1501 may be formed and defined entirely with additive manufacturing, without the use of molding and/or subtractive manufacturing (e.g. machining/milling). Further, for example, each feature of the diffuser 500 as shown in FIGS. 16A-C, including the lower portion 501, upper portion 502, central portion 503, opening 505, lip 600, L-shaped slots 801 and ridges 1501 may be formed and defined entirely with additive manufacturing, without the use of molding and/or subtractive manufacturing (e.g. machining/milling). In some embodiments, the lens retaining ring 400 may have a diameter corresponding to the outer diameter of the diffuser 500 including any protrusions in order to define a flush outer profile of the assembly of the diffuser 500 and lens retaining ring 400.

In some embodiments, the upper housing 200 and/or lens retaining ring 400, including all features thereof, may be formed with additive manufacturing. For example the body of the upper housing 200 and the tabs 204 may be formed monolithically with additive manufacturing. Similarly, the lens retaining ring 400, including the groove 403, opening 404 and ledge 405 may be formed monolithically with additive manufacturing.

The components of the lighting systems 100 disclosed herein may be formed monolithically, i.e. formed of a single material as a single piece without joints or seams where separate components are joined. For example, as noted above the diffuser 500 may be formed monolithically with additive manufacturing, e.g. 3D printing. The additive manufacturing may include fused deposition modeling (FDM), Stereolithography (SLA), Selective Laser Sintering (SLS), and Material Jetting (MJ). The components of the lighting systems 100 disclosed herein may be formed with additive manufacturing from plastics or metal, for example, but not limited to polylactic acid (PLA) or aluminum.

In some embodiments, the additive manufacturing technique used to form the diffuser 500 may result in visible striations and/or imperfections that create visible and unwanted lines, patterns, and other inconsistencies when light passes through the diffuser 500. In some embodiments, the diffuser 500 may be formed with patterns of protrusions and surface shapes, including ridges, lines, and that mask and/or minimize the appearance of visible striations and/or imperfections. Additionally, such protrusions and surface shapes can also serve to stiffen/strengthen the diffuser. In some embodiments, a lighting system 100 may include a patterned sheet positioned around the inside and/or outside of the diffuser 500. The patterned sheet may be a die cut piece of opaque material (e.g. metal, plastic, etc.) including for example a lattice like pattern. The pattern of the sheet may additionally or alternatively mask and/or minimize the visual effect of the visible striations and/or imperfections in the additively manufactured diffuser 500.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

What is claimed is:

1. A lighting system comprising:
   an upper housing, wherein the upper housing is configured to support a light engine; and
   a monolithic diffuser formed by an additive manufacturing process and coupled to the upper housing, wherein the diffuser extends along a longitudinal axis from an upper portion through a central portion and to a lower portion and comprises a diffuser sidewall having an outer surface and an inner surface defining an internal cavity, wherein the central portion of the diffuser is configured to diffuse light emitted by the light engine into the internal cavity in directions radially away from the longitudinal axis, and wherein the upper portion is configured to directly couple to the upper housing with a tool-less connection in order to allow the diffuser to be coupled to and uncoupled from the upper housing by rotating the diffuser in a direction around the longitudinal axis, wherein the diffuser sidewall comprises visual artifacts formed as byproducts of the additive manufacturing process, wherein the visual artifacts are visible when light passes through the diffuser.

2. The lighting system of claim 1, wherein the lower portion defines a lip extending in a radial direction relative to the longitudinal axis;

wherein the lighting system further comprises:
a lens retaining ring defining a substantially continuous circumference, wherein the lens retaining ring is adapted to couple to the lower portion of the diffuser via an annular snap-fit connection in a direction from the lower portion towards the upper portion of the diffuser such that the lens retaining ring extends substantially entirely around the lip; and
a lens captured between the lower portion of the diffuser and the lens retaining ring, wherein the lens is configured to filter light emitted by the light engine passing through the internal cavity defined by the diffuser.

3. The lighting system of claim 1, wherein the additive manufacturing process comprises at least one of: fused deposition modeling (FDM), Stereolithography (SLA), Selective Laser Sintering (SLS), and Material Jetting (MJ).

4. The lighting system of claim 1, wherein the upper portion comprises a planar top surface substantially perpendicular to the longitudinal axis and in which is defined a plurality of key-hole openings, wherein the plurality of key-hole openings are defined in the additive manufacturing process,
wherein the upper housing comprises a plurality of studs extending downwardly from the upper housing in a direction substantially parallel to the longitudinal axis, and
wherein the tool-less connection comprises the plurality of key-hole openings and the plurality of studs.

5. The lighting system of claim 4, wherein the plurality of studs each comprise a screw extending downwardly from the upper housing.

6. A lighting system, comprising:
an upper housing, wherein the upper housing is configured to support a light engine; and
a monolithic diffuser formed by an additive manufacturing process and coupled to the upper housing, wherein the diffuser extends along a longitudinal axis from an upper portion through a central portion and to a lower portion and comprises an outer surface and an inner surface defining an internal cavity, wherein the diffuser is configured to diffuse light emitted by the light engine into the internal cavity in directions radially away from the longitudinal axis, and wherein the upper portion is configured to directly couple to the upper housing with a tool-less connection in order to allow the diffuser to be coupled to and uncoupled from the upper housing by rotating the diffuser in a direction around the longitudinal axis, wherein the upper portion comprises an internal diffuser sidewall facing, and defining an opening around, the longitudinal axis;
wherein the opening is configured so that light emitted from the light engine passes through the opening and into the internal cavity,
wherein the internal diffuser sidewall comprises a plurality of L-shaped slots defined in the internal diffuser sidewall and invisible on the outer surface of the diffuser, each of the plurality of L-shaped slots comprising a first slot portion extending substantially parallel to the longitudinal axis and a second slot portion extending along a curved path around and substantially perpendicular to the longitudinal axis,
wherein the upper housing comprises an upper housing outer sidewall and a plurality of tabs positioned on the upper housing outer sidewall and extending radially away from the longitudinal axis, and
wherein the tool-less connection comprises the plurality of L-shaped slots and the plurality of tabs.

7. The lighting system of claim 6, wherein the plurality of L-shaped slots are formed with the additive manufacturing process.

8. The lighting system of claim 6, wherein the upper housing, including the plurality of tabs, are formed with additive manufacturing.

9. The lighting system of claim 2, wherein the lip extends radially away from the longitudinal axis,
wherein the lens retaining ring defines an inwardly facing groove, and
wherein the lip is positioned within the groove.

10. The lighting system of claim 9, wherein the lip and groove are circular in shape.

11. The lighting system of claim 9, wherein the lip and groove are rectangular in shape.

12. The lighting system of claim 9, wherein the lens retaining ring, including the groove, is formed with additive manufacturing.

13. The lighting system of claim 9, wherein the lens and the lip are positioned within the groove.

14. The lighting system of claim 9, wherein the lens retaining ring is coupled to diffuser without using adhesives or fasteners, and
wherein the annular snap-fit connection is configured to allow the lens retaining ring to be uncoupled from the diffuser in order to replace the lens with a second lens captured between the lower portion and lens retaining ring.

15. The lighting system of claim 1, wherein the diffuser is coupled to the upper housing without using adhesives, and
wherein the tool-less connection is configured to allow the diffuser to be uncoupled from the upper housing in order to replace the diffuser with a second diffuser comprising a portion of the tool-less connection.

16. The lighting system of claim 1, wherein a plurality of protrusions extend outwardly from the outer surface of the diffuser sidewall.

17. The lighting system of claim 16, wherein the plurality of protrusions comprises a plurality of ridges, and
wherein the ridges extend between the lower portion and the upper portion in a wave-shaped pattern.

18. A method of manufacturing the lighting system of claim 1, comprising:
forming the diffuser monolithically with the additive manufacturing process; and
coupling the diffuser to the upper housing with the tool-less connection.

19. A method of manufacturing the lighting system of claim 2, comprising:
   forming the diffuser monolithically with the additive manufacturing process;
   coupling the diffuser to the upper housing with the tool-less connection; and
   capturing the lens between the diffuser and the lens retaining ring by coupling the lens retaining ring to the diffuser with the annular snap-fit connection.

20. The lighting system of claim 1, wherein the visual artifacts comprise at least one of striations, lines, or patterns.

21. The lighting system of claim 1, wherein the diffuser further comprises a plurality of ridges extending outwardly from the outer surface of the diffuser sidewall and formed integrally with the diffuser sidewall via the additive manufacturing process.

22. The lighting system of claim 1, wherein the diffuser sidewall comprises a plurality of openings through which light passes through the diffuser.

* * * * *